United States Patent
Lee et al.

(10) Patent No.: US 10,259,283 B2
(45) Date of Patent: Apr. 16, 2019

(54) VEHICLE SUSPENSION APPARATUS CAPABLE OF ADJUSTING VEHICLE HEIGHT

(71) Applicants: Hyundai Motor Company, Seoul (KR); Kia Motors Corporation, Seoul (KR)

(72) Inventors: Sang Hoon Lee, Yongin-si (KR); Chang Sin Lee, Seoul (KR); Youn Hyung Cho, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 83 days.

(21) Appl. No.: 15/632,019

(22) Filed: Jun. 23, 2017

(65) Prior Publication Data

US 2018/0170139 A1 Jun. 21, 2018

(30) Foreign Application Priority Data

Dec. 15, 2016 (KR) ........................ 10-2016-0171851

(51) Int. Cl.
*B60G 13/00* (2006.01)
*B60G 17/02* (2006.01)
(Continued)

(52) U.S. Cl.
CPC ......... *B60G 13/005* (2013.01); *B60G 17/016* (2013.01); *B60G 17/018* (2013.01);
(Continued)

(58) Field of Classification Search
CPC .. B60G 17/021; B60G 17/015; B60G 13/005; B60G 2400/252; B60G 2500/30; F16F 9/56
(Continued)

(56) References Cited

U.S. PATENT DOCUMENTS

| 4,718,683 A | * | 1/1988 | Perga | B60G 15/068 280/6.157 |
| 9,987,897 B2 | * | 6/2018 | Mersmann | B60G 11/16 |

(Continued)

FOREIGN PATENT DOCUMENTS

| DE | 102015208787 A1 | * | 11/2016 | B60G 11/16 |
| KR | 10-2005-0120948 A | | 12/2005 | |

*Primary Examiner* — Ruth Ilan
(74) *Attorney, Agent, or Firm* — Morgan, Lewis & Bockius LLP

(57) ABSTRACT

A vehicle suspension apparatus configured for adjusting vehicle height may include a fixing device disposed at a wheel side, provided on an internal peripheral surface along its perimeter with a plurality of fixing grooves; a moving device provided to be rotatable within the fixing device, formed along its perimeter with coupling grooves corresponding to the fixing grooves and coupled such that a shock absorber moves in an up and down direction; a driving device disposed at the fixing device to transmit power; and a drive shaft provided to be rotatable within the moving device and provided with a fixing pin inserted into the coupling groove of the moving device and the fixing groove of the fixing device such that the fixing pin is disengaged from the fixing groove and remains inserted only into the coupling groove when the drive shaft rotates.

9 Claims, 5 Drawing Sheets

(51) Int. Cl.
*B60G 17/018* (2006.01)
*F16F 9/56* (2006.01)
*B60G 17/016* (2006.01)
*B60G 17/06* (2006.01)
*F16F 15/02* (2006.01)

(52) U.S. Cl.
CPC ............ *B60G 17/021* (2013.01); *B60G 17/06* (2013.01); *F16F 9/56* (2013.01); *F16F 15/022* (2013.01); *B60G 2204/129* (2013.01); *B60G 2204/4304* (2013.01); *B60G 2400/252* (2013.01); *B60G 2500/30* (2013.01)

(58) Field of Classification Search
USPC ....................................................... 280/5.514
See application file for complete search history.

(56) References Cited

U.S. PATENT DOCUMENTS

| | | | |
|---|---|---|---|
| 2008/0111334 A1* | 5/2008 | Inoue .................... | B60G 17/021 |
| | | | 280/124.1 |
| 2014/0167372 A1* | 6/2014 | Kim .................... | B60G 17/0157 |
| | | | 280/6.157 |
| 2014/0175763 A1* | 6/2014 | Kim ..................... | B60G 15/063 |
| | | | 280/5.514 |
| 2016/0193890 A1* | 7/2016 | Dobre .................. | B60G 15/062 |
| | | | 280/5.514 |
| 2017/0151851 A1* | 6/2017 | Alpers ................. | B60G 15/062 |
| 2017/0291465 A1* | 10/2017 | Christoff .................. | B60G 3/20 |
| 2018/0170140 A1* | 6/2018 | Lee ...................... | B60G 13/005 |

\* cited by examiner

VEHICLE SUSPENSION APPARATUS CAPABLE OF ADJUSTING VEHICLE HEIGHT

CROSS REFERENCE TO RELATED APPLICATION

The present application claims priority of Korean Patent Application No. 10-2016-0171851 filed on Dec. 15, 2016, the entire contents of which is incorporated herein for all purposes by this reference.

BACKGROUND OF THE INVENTION

Field of the Invention

The present invention relates to a vehicle suspension apparatus configured for adjusting vehicle height depending on driving situation and surrounding conditions.

Description of Related Art

Recently, a variety of suspensions have been developed to improve ride comfort of a vehicle and noise environment inside the vehicle.

The suspension is one of major components of an automobile that serves to connect between an axle and a frame or a chassis and absorb vibration or shock transmitted from a road surface during traveling, thereby improving ride comfort and safety of the automobile. The suspension may be composed of a lower arm, an upper arm, a step link, a spring, a shock absorber, a ball joint and the like.

Such a suspension is supported by the spring and the shock absorber to mechanically harmonize relative movement between a vehicle body and a wheel. Further, the suspension allows a tire to be securely grounded on the ground so that the vehicle body can be brought into close to the ground during high speed driving of the vehicle.

However, when a vehicle drives on a road on which a speed bump is formed or on a dirt road, there is a risk that if the vehicle is low, the vehicle is hit by the road surface and there is also a problem that if a running situation such as rolling or pitching of the vehicle occurs, the vehicle tilts and thus, ride comfort and steering ability are deteriorated.

Therefore, in order to automatically control posture of a vehicle, electronic controlled suspensions have been developed and used that electronically control a shock absorber. Also, active suspensions have been used that strives for driving stability and steering ability by adopting a hydraulic system having excellent response performance and controlling vibration of the vehicle body depending on running conditions.

However, in the case of conventional hydraulic active suspension, there are problems that implementing such an active suspension system is complicated because a hydraulic pump, a reservoir, a hydraulic line and a cylinder block are required and that due to the nature of the hydraulic system, fuel economy is lowered and $CO_2$ emissions are increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle suspension apparatus configured for adjusting vehicle height depending on driving situation and surrounding conditions, enhancing driving performance.

A vehicle suspension apparatus configured for adjusting vehicle height according to an exemplary embodiment of the present invention for accomplishing the object as mentioned above includes: a fixing device disposed at a wheel side, formed to communicate in an up and down direction and provided on an internal peripheral surface along its perimeter with a plurality of fixing grooves; a moving device provided to be rotatable within the fixing device, formed to communicate in an up and down direction, formed along its perimeter with coupling grooves corresponding to the fixing grooves and coupled such that a shock absorber moves in an up and down direction when the moving device rotates; a driving device disposed at the fixing device to transmit power; and a drive shaft provided to be rotatable within the moving device to receive power from the driving device and hence rotate and provided with a fixing pin inserted into the coupling groove of the moving device and the fixing groove of the fixing device such that the fixing pin is disengaged from the fixing groove and remains inserted only into the coupling groove when the drive shaft rotates.

The plurality of fixing grooves are formed to be distanced from each other at a predetermined interval along the perimeter of the internal peripheral surface of the fixing device, while the coupling grooves are formed in the moving device to penetrate the moving device at the same interval and number as the fixing grooves.

The shock absorber has an upper end portion coupled to the vehicle body and a lower end portion inserted into the moving device, a guide screw is formed on an internal peripheral surface of the moving device, and a corresponding screw is formed on an external peripheral surface of the lower end portion of the shock absorber, so that the shock absorber can be moved in an up and down direction when the moving device rotates.

The driving device includes a motor disposed to be fixed to the fixing device and a power transmission portion of which one end portion is connected to the motor and the other end portion is connected to the drive shaft to rotate the drive shaft during operation of the motor.

The drive shaft includes an input shaft which receives power from the driving device and is rotated and a support shaft formed to be smaller in width than the input shaft and protrude from a top end portion of the input shaft, wherein the fixing pin may be rotatably mounted on the input shaft or the support shaft.

The fixing pin includes a lever portion rotatably mounted on the input shaft and a locking portion which is rotatably disposed to the lever portion and formed to be inserted into the coupling groove of the moving device and the fixing groove of the fixing device.

A hinge pin is formed to protrude from the top end portion of the input shaft and the lever portion is connected to the hinge pin to rotate about the hinge pin.

Length of the lever portion is set such that the lever portion is rotated and moved along the input shaft when the input shaft rotates and the locking portion is disengaged only from the fixing groove.

A distal end portion of the locking portion is formed on its both sides with engaging end portions.

According to the vehicle suspension apparatus configured for adjusting vehicle height, which is configured as described above, driving performance of a vehicle is enhanced by adjusting the vehicle height depending on driving situation of the vehicle.

Furthermore, when a vehicle enters a ramp or passes over a speed bump or a mound, the vehicle height can be adjusted to prevent the vehicle from being hit and damaged by the road surface.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
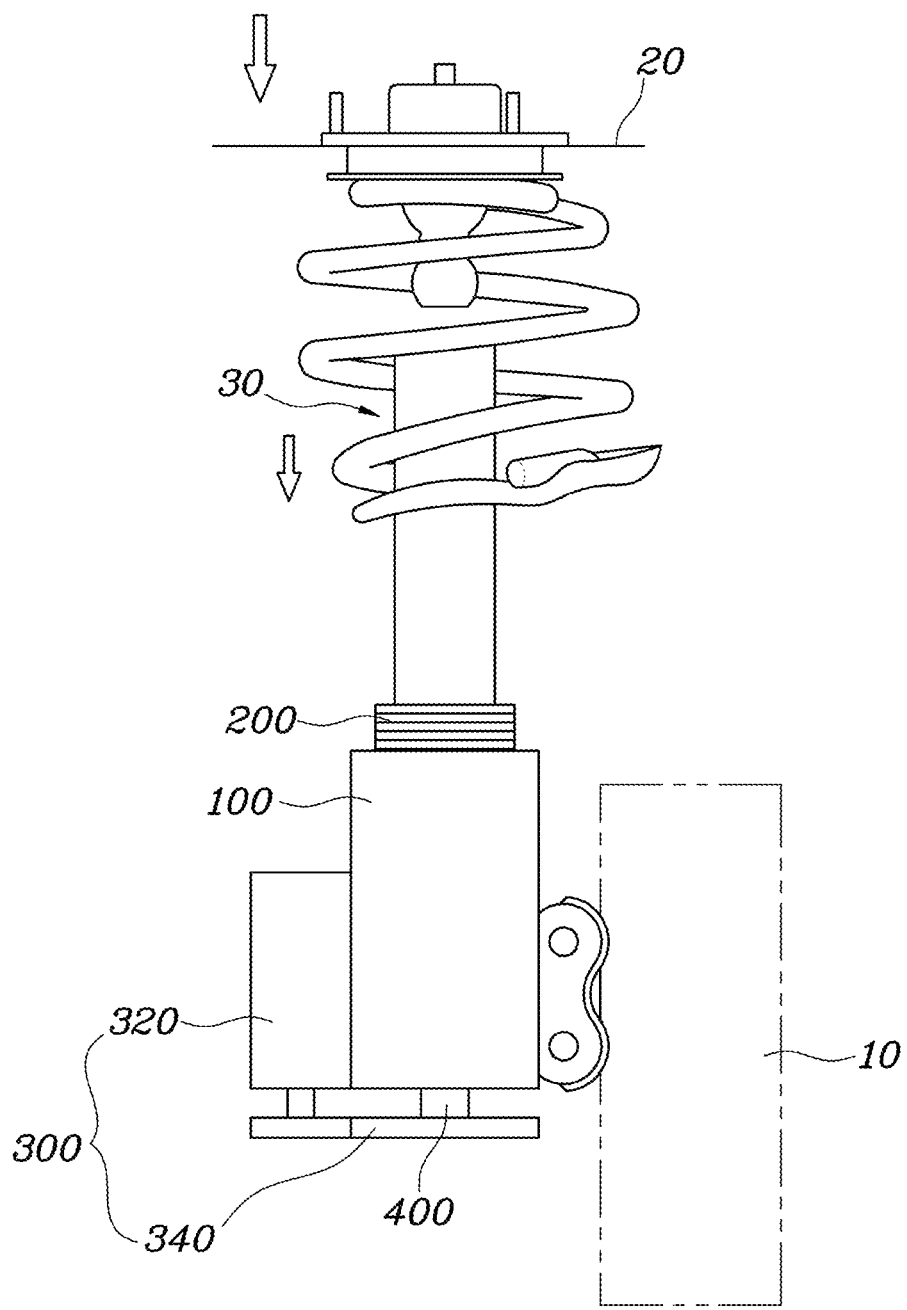
FIG. 1 is a view of a vehicle suspension apparatus configured for adjusting vehicle height, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A suspension apparatus for a vehicle, which is configured for adjusting a vehicle height, according to an exemplary embodiment of the present invention will now be described in detail with reference to the accompanying drawings. However, the present invention is not limited or restricted by the exemplary embodiments.

Figure 2:
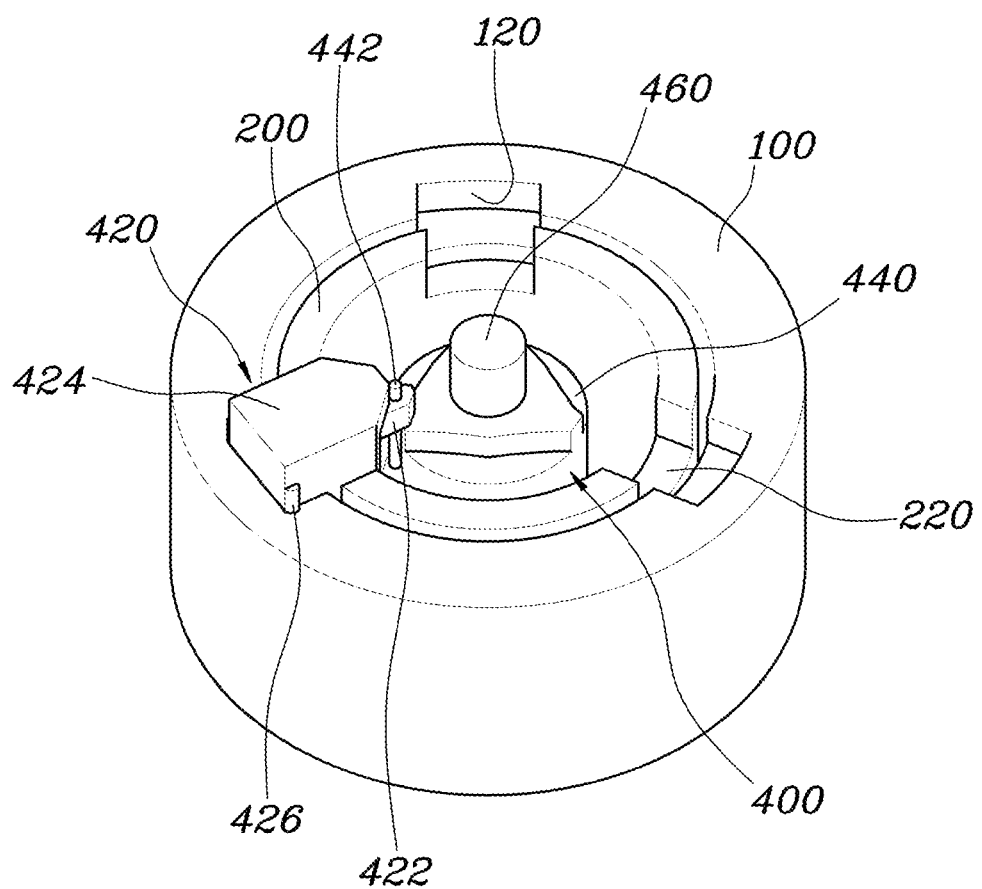
FIG. 2 is a cross section view for illustrating a vehicle suspension apparatus configured for adjusting vehicle height shown in FIG. 1.
Figure 3:
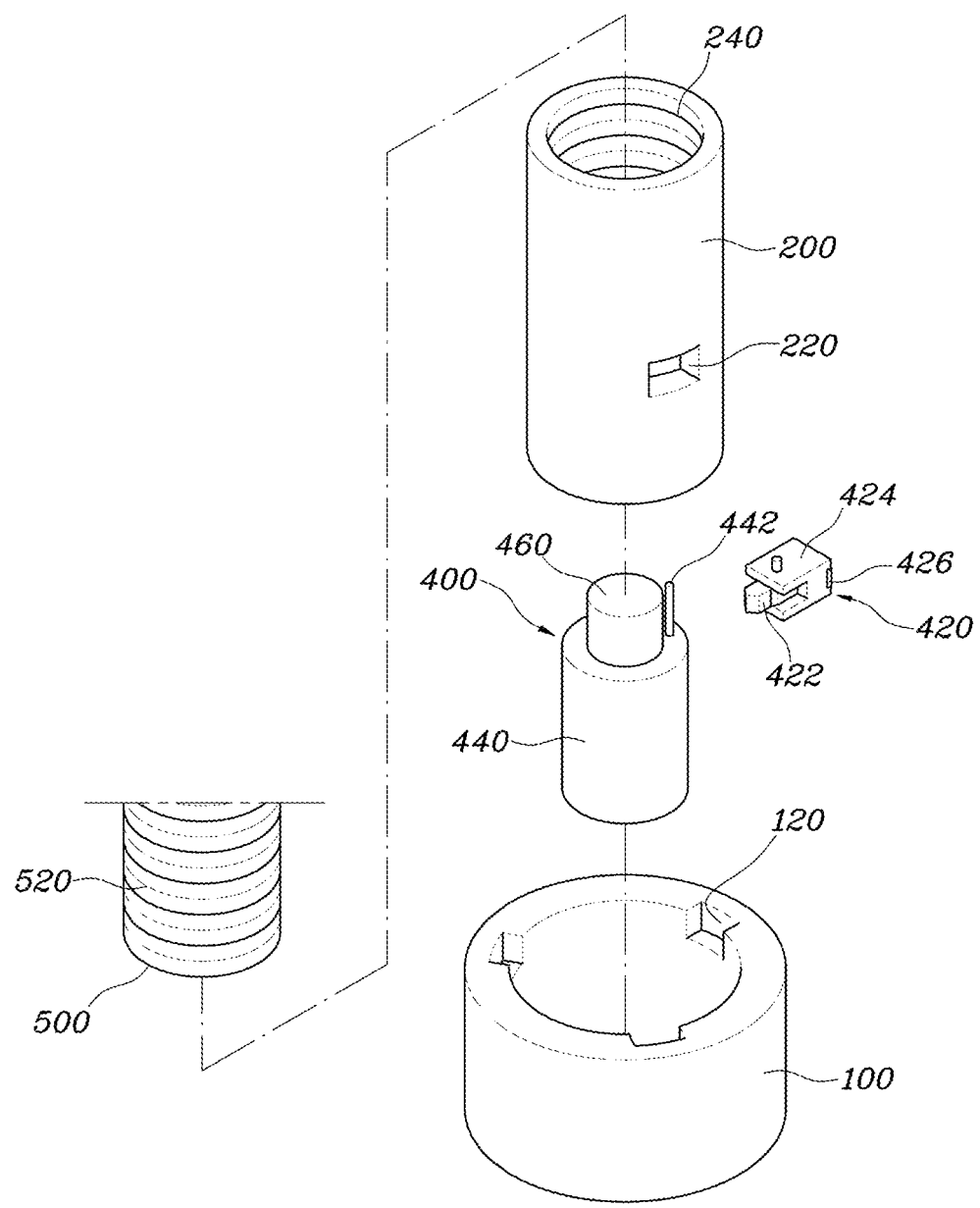
FIG. 3 is an assembled view of a vehicle suspension apparatus configured for adjusting vehicle height shown in FIG. 1.
Figure 4:
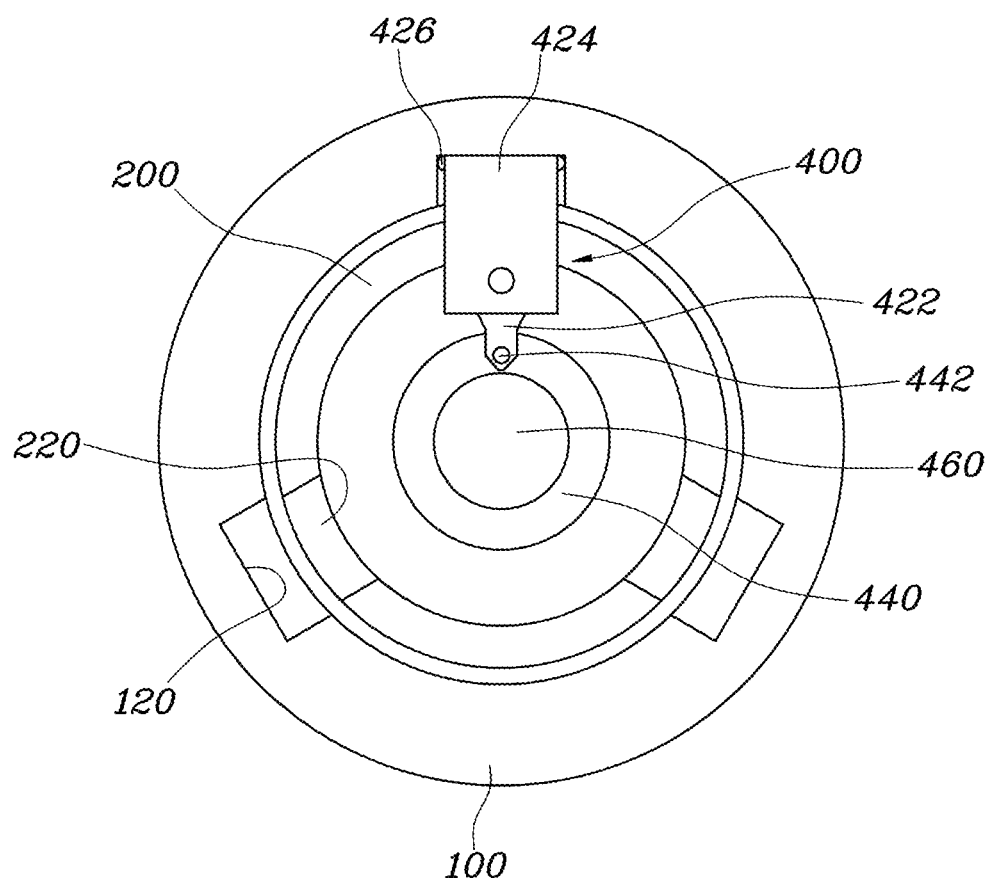
FIG. 4 and FIG. 5 are views for illustrating operation of a vehicle suspension apparatus configured for adjusting vehicle height shown in FIG. 1.
Figure 5:
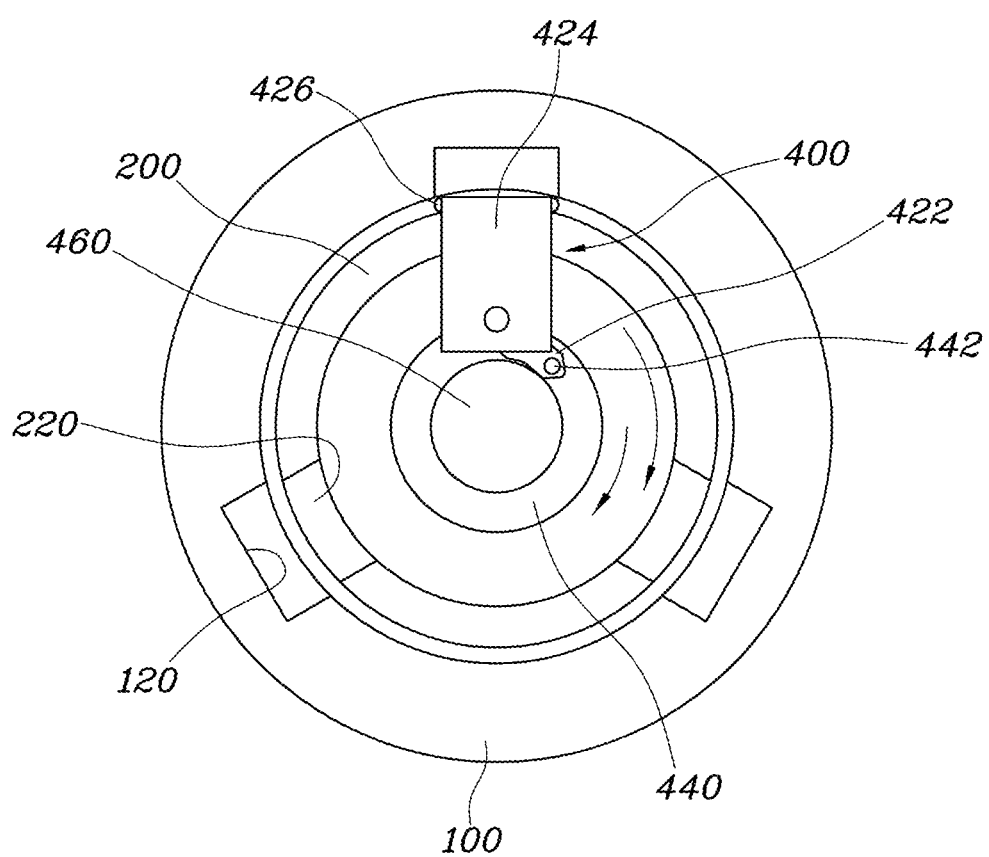

FIG. 1 is a view of a vehicle suspension apparatus configured for adjusting vehicle height, according to an exemplary embodiment of the present invention, FIG. 2 is a cross section view for illustrating a vehicle suspension apparatus configured for adjusting vehicle height shown in FIG. 1, FIG. 3 is an assembled view of a vehicle suspension apparatus configured for adjusting vehicle height shown in FIG. 1, and FIG. 4 and FIG. 5 are views for illustrating operation of a vehicle suspension apparatus configured for adjusting vehicle height shown in FIG. 1.

As shown in FIG. 1 and FIG. 2, a vehicle suspension apparatus configured for adjusting vehicle height according to an exemplary embodiment of the present invention includes: a fixing device 100 disposed at a wheel 10 side, formed to communicate in an up and down direction and provided on an internal peripheral surface along its perimeter with a plurality of fixing grooves 120; a moving device 200 provided to be rotatable within the fixing device 100, formed to communicate in an up and down direction, formed along its perimeter with coupling grooves 220 corresponding to the fixing grooves 120 and coupled such that a shock absorber 500 moves in an up and down direction when the moving device rotates; a driving device 300 disposed at the fixing device 100 to transmit power; and a drive shaft 400 provided to be rotatable within the moving device 200 to receive power from the driving device 300 and hence rotate and provided with a fixing pin 420 inserted into the coupling groove 220 of the moving device 200 and the fixing groove 120 of the fixing device 100 such that the fixing pin is disengaged from the fixing groove 120 and remains inserted only into the coupling groove 220 when the drive shaft rotates.

In the present exemplary embodiment of the present invention, the fixing device 100 is coupled to the wheel 10 side and formed into a cylindrical shape, while the moving device 200 is rotatably mounted within the fixing device 100. In the present exemplary embodiment, a shock absorber 500 coupled to a vehicle body 20 may be rotatably connected to the moving device 200 wherein the shock absorber 500 may be provided with a spring connection structure. That is, the moving device 200 may be configured to absorb vibration transmitted from the wheel 10 through the shock absorber 500. As the shock absorber 500 moves up and down by rotation of the moving device 200, vehicle height can be adjusted.

To this end, the driving device 300 for transmitting power is provided and the shock absorber 500 is configured to move in the up and down direction as the drive shaft 400 which receives power from the driving device 300 and is rotated is rotated with the moving device 200 and hence the moving device 200 rotates.

as shown in FIG. 3, the shock absorber 500 has an upper end portion coupled to the vehicle body 20 and a lower end portion inserted into the moving device 200, a guide screw 240 is formed on an internal peripheral surface of the moving device 200, and a corresponding screw 520 is formed on an external peripheral surface of the lower end portion of the shock absorber 500, so that the shock absorber 500 can be moved in an up and down direction when the moving device 200 rotates.

That is, the movable device 200 and the shock absorber 500 are connected to each other by screwing so that the lower end portion of the shock absorber 500 rides on the guide screw 240 of the movable device 200 and moves in an up and down direction when the moving device 200 rotates. The moving device 200 and the shock absorber 500 form a structure connected in a manner of a ball screw wherein the moving device 200 acts as a screw nut and the shock absorber 500 acts as a screw shaft so that the shock absorber 500 moves up and down when the moving device 200 rotates.

to force the moving device 200 to rotate in response to driving situation and surrounding conditions of a vehicle, a driving device 300 is provided wherein the driving device 300 is connected to the moving device 200 and the fixing device 100 through the drive shaft 400.

The plurality of fixing grooves 120 are formed on the internal peripheral surface along the perimeter of the fixing part 100, while the coupling grooves 220 are formed along the perimeter of the moving device 200. In the present exemplary embodiment, the plurality of fixing grooves 120 may be formed to be distanced from each other at a predetermined interval along the perimeter of the internal peripheral surface of the fixing device 100, while the coupling grooves 220 are formed in the moving device 200 to penetrate the moving device at the same interval and number as the fixing grooves 120. In this manner, the plurality of fixing grooves 120 and the plurality of coupling grooves 220 are formed along the perimeter so that rotational position of the drive shaft 400 formed with a fixing pin 420 as described below can be fixed at various positions.

The fixing pin 420 that can be inserted into the fixing groove 120 as well as the coupling groove 220 is rotatably disposed on the drive shaft 400, wherein when the fixing pin 420 is inserted into both the fixing groove 120 of the fixing device 100 and the coupling groove 220 of the moving device 200, rotation of the moving device 200 is restricted in the fixing device 100, whereas when the drive shaft 400 receives power from the driving device 300 and is rotated Accordingly, the fixing pin 420 follows the drive shaft 400 and rotates together with the drive shaft and hence the fixing pin 420 is disengaged from the fixing groove 120, with the result that rotation of the moving device 200 is allowed.

Here, it is noted that when the drive shaft 400 rotates, the fixing pin 420 is disengaged from the fixing groove 120 but remains inserted into the coupling groove 220 of the moving device 200 so that the moving device 200 and the drive shaft 400 rotate together. In this manner, when the drive shaft 400 receives power from the driving device 300 and is rotated Accordingly, the moving device 200 is rotated with the drive shaft 400 in the same direction and the shock absorber 500 connected to the moving device 200 by screwing receives rotational force of the moving device 200 and is rotated up and down, with the result that the vehicle height can be adjusted.

On the other hand, as shown in FIG. 1, the driving device 300 may comprise a motor 320 disposed to be fixed to the fixing device 100 and a power transmission portion 340 of which one end portion is connected to the motor 320 and the other end portion is connected to the drive shaft 400 to rotate the drive shaft 400 during operation of the motor 320.

In the instant case, the motor 320 of the driving device 300 may be operated under the control of an Electronic Control Unit (ECU) of the vehicle and the motor 320 and the power transmission portion 340 may be connected to each other by gearing or by a chain to transmit power. The motor 320 may be provided with a gear which is rotated when the motor 320 operates and the power transmission portion 340 having a gear corresponding to the gear of the motor may be integrally coupled to the drive shaft 400 and hence the gears of the power transmission portion 340 and the motor 320 are meshed with each other such that the drive shaft 400 can rotate together with the power transmission portion 340 when the motor 320 operates.

On the other hand, as shown in FIG. 2 and FIG. 3, the drive shaft 400 includes an input shaft 440 which receives power from the driving device 300 and is rotated and a support shaft 460 formed to be smaller in width than the input shaft 440 and protrude from a top end portion of the input shaft 440, wherein the fixing pin 420 may be rotatably mounted on the input shaft 440 or the support shaft 460.

In the instant case, the fixing pin 420 may comprise a lever portion 422 rotatably mounted on the input shaft 440 and a locking portion 424 which is rotatably disposed to the lever portion 442 and formed to be inserted into the coupling groove 220 of the moving device 200 and the fixing groove 120 of the fixing device 100.

As mentioned above, the drive shaft 400 includes the input shaft 440 which receives power from the driving device 300 and is rotated and the support shaft 460 formed to protrude from the top end portion of the input shaft 440 and have a smaller width than the input shaft 440. As a result, when the lever portion 422 of the fixing pin 420 rotates to an appropriate extent on the input shaft 440, it contacts with the support shaft 460 so that excessive rotation thereof is restricted. In the instant case, to allow the lever portion 422 to rotate on the input shaft 440, a hinge pin 442 is formed to protrude from the top end portion of the input shaft 440 and the lever portion 422 is connected to the hinge pin 442 to rotate about the hinge pin 442.

Since the lever portion 422 is rotatably connected to a locking portion 424, even when the lever portion 422 is rotated on the input shaft 440, the locking portion 424 can remain inserted into the coupling groove 220 of the moving device 200 or the fixing groove 120 of the fixing device 100.

In addition, length of the lever portion 422 can be set such that the lever portion 442 is rotated and moved along the input shaft 440 when the input shaft 440 rotates and the locking portion 424 is disengaged only from the fixing groove 120. That is, when the length of the lever portion 422 is formed too long, the locking portion 424 connected to the lever portion 422 may not be disengaged from the fixing groove 120 even when the lever portion 422 is rotated with the input shaft 440, whereas when the length of the lever portion 422 is formed too short, there is a problem that the locking portion 424 is disengaged from both the fixing groove 120 and the coupling groove 220 when the input shaft 440 rotates. Accordingly, the length of the lever portion 422 is set such that the locking portion 424 can disengaged only from the fixing groove 120.

On the other hand, as shown in FIG. 2, a distal end portion of the locking portion 424 is formed on its both sides with engaging end portions 426. The engaging end portion 426 may be including a resiliently deformable leaf spring wherein when the locking portion 424 is inserted into the fixing groove 120, the engaging end portion 426 remains in contact with the inside of the fixing groove 120 so that noise to be caused by impact can be reduced. Further, the engaging end portion 426 may be configured to be caught to the moving portion 200 when the input shaft 440 is rotated and hence the locking portion 424 connected to the lever portion 422 is disengaged from the fixing groove 120 as the driving portion 300 is operated.

Operation of the vehicle suspension apparatus configured for adjusting vehicle height according to an exemplary embodiment of the present invention will be described below.

As shown in FIG. 4, when the vehicle height is fixed, the locking portion 424 of the fixing pin 420 provided on the drive shaft 400 is inserted into the fixing groove 120 of the fixing device 100 and the coupling groove 220 of the moving device 200, resulting in restriction of rotation of the moving device 200. That is, as the rotation of the moving part 200 is restricted by the fixing pin 420, up and down movement of the shock absorber 500 coupled to the vehicle body 20 side is also limited and thus, a state in which the vehicle height does not change is maintained.

In the instant case, as shown in FIG. 5, when the vehicle height is adjusted, the driving device 300 is operated and in turn the input shaft 440 is rotated. At this time, as the lever portion 422 rotatably connected to the input shaft 440 moves together with the input shaft 440 along a rotational direction of the input shaft and the locking portion 424 rotatably connected to the lever portion 422 moves along the lever portion 422, the locking portion 424 is disengaged from the fixing groove 120 of the fixing device 100. Here, it is noted that the lever portion 422 comes into contact with the support shaft 460 formed on the input shaft 440 and thus, rotation of the lever portion is restricted while the locking portion 424 remains inserted only into the coupling groove 220 of the moving device 200 so that the moving device 200 rotates in the same direction as the rotational direction of the input shaft 440.

As a result, the shock absorber 500 inserted into the moving device 200 rotates along the guide screw 240 of the moving device 200 and moves up and down. As the shock absorber 500 moves up and down in this manner, height of the vehicle body 20 can be adjusted. For example, it may be configured such that the vehicle height is raised when the driving device 300 is rotated in a forward direction whereas the vehicle height is lowered when the driving device 300 is rotated in a backward direction.

According to the vehicle suspension apparatus configured for adjusting vehicle height, which is configured as described above, driving performance of a vehicle is enhanced by adjusting the vehicle height depending on driving situation of the vehicle. Furthermore, when a vehicle enters a ramp or passes over a speed bump or a mound, the vehicle height can be adjusted to prevent the vehicle from being hit and damaged by the road surface.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle suspension apparatus configured for regulating vehicle height, the vehicle suspension apparatus including:
   a fixing device disposed at a wheel side, formed to communicate in an up and down direction thereof and provided on an internal peripheral surface along a perimeter thereof with a plurality of fixing grooves;
   a moving device provided to be rotatable within the fixing device, formed to communicate in an up and down direction thereof, formed along a perimeter thereof with coupling grooves corresponding to the fixing grooves and coupled with a shock absorber such that the shock absorber is configured to move in an up and down direction thereof;
   a driving device disposed at the fixing device to transmit power; and
   a drive shaft provided to be rotatable within the moving device to receive power from the driving device and hence rotate and provided with a fixing pin inserted into one of the coupling grooves of the moving device and the corresponding fixing groove of the fixing device, and wherein the fixing pin is disengaged from the corresponding fixing groove and remains inserted into one of the coupling grooves when the drive shaft rotates.

2. The vehicle suspension apparatus of claim 1, wherein the plurality of fixing grooves is formed to be distanced from each other at a predetermined interval along a perimeter of the internal peripheral surface of the fixing device and the coupling grooves are formed in the moving device to penetrate the moving device at a same interval and number as the fixing grooves.

3. The vehicle suspension apparatus of claim 1, wherein the shock absorber has an upper end portion coupled to the vehicle body and a lower end portion inserted into the moving device, a guide screw is formed on an internal peripheral surface of the moving device, and a corresponding screw is formed on an external peripheral surface of the lower end portion of the shock absorber, wherein the shock absorber is configured to be moved in an up and down direction thereof when the moving device rotates.

4. The vehicle suspension apparatus of claim 1, wherein the driving device includes a motor fixed to the fixing device and a power transmission portion of which a first end portion is connected to the motor and a second end portion is connected to the drive shaft to rotate the drive shaft during operation of the motor.

5. The vehicle suspension apparatus of claim 1, wherein the drive shaft includes an input shaft which is configured to receive power from the driving device and is rotated and a support shaft formed to be smaller in width than the input shaft and protrude from a top end portion of the input shaft and wherein the fixing pin is configured to be rotatably mounted on the input shaft or the support shaft.

6. The vehicle suspension apparatus of claim 5, wherein the fixing pin includes a lever portion rotatably mounted on the input shaft and a locking portion which is rotatably disposed to the lever portion and formed to be inserted into the one of the coupling grooves of the moving device and the corresponding fixing groove of the fixing device.

7. The vehicle suspension apparatus of claim 6, wherein a hinge pin is formed to protrude from the top end portion of the input shaft and the lever portion is connected to the hinge pin to rotate about the hinge pin.

8. The vehicle suspension apparatus of claim 6, wherein a length of the lever portion is set, and wherein the lever portion is rotated and configured to be moved along the input shaft when the input shaft rotates and the locking portion is disengaged from the corresponding fixing groove.

9. The vehicle suspension apparatus of claim 6, wherein a distal end portion of the locking portion is formed on a first side and a second side thereof with engaging end portions.

* * * * *